United States Patent Office 3,282,998
Patented Nov. 1, 1966

3,282,998
PROCESS FOR PREPARING 1-ETHYL-2-METHYL PENTANOYL UREA
Phillip Adams, Murray Hill, Benedict R. Juliano, Elizabeth, and Howard Feilich, North Plainfield, N.J., assignors to Millmaster Onyx Corporation, New York, N.Y., a corporation of New York
No Drawing. Filed Oct. 15, 1965, Ser. No. 496,658
4 Claims. (Cl. 260—553)

This invention relates to new and useful improvements in the preparation of 1-ethyl-2-methyl pentanoyl urea. This material finds great utility as a pharmaceutical containing a minimum of undesirable side products.

1-ethyl-2-methyl pentanoyl urea has the formula:

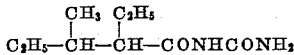

The preparation of 1-ethyl-2-methyl pentanoyl urea by various reported techniques is characterized by undesirable side products and low yields.

It has now been found that 1-ethyl-2-methyl pentanoyl urea can be prepared by condensing the acid chloride of 2-ethyl-3-methyl pentanoic acid with urea in the presence of a diluent selected from the group consisting of nitromethane, nitroethane, nitropropanes, acetonitrile and sulfolane.

It is surprising that these specific diluents enhance the yields of the desired product because other solvents do not have an equivalent effect. Thus, the choice of the diluents is strictly empiric.

The 2-ethyl-3-methyl pentanoic acid can be prepared by oxidizing 2-ethyl-3-methyl pentanal as covered in our copending application, Serial No. 498,104, filed October 19, 1965.

The acid chloride is then prepared in the conventional manner by treating the acid with chlorinating material such as $SOCl_2$, $PCl_3$.

The reactants for preparing 1-ethyl-2-methyl pentanoyl urea are utilized in about 2 to 5 moles of urea/mole acid chloride.

Temperatures in the range of about 40–120° C., preferably 70–90° C., are utilized.

As stated, an organic diluent selected from the group consisting of nitromethane, nitroethane, nitropropanes, acetonitrile and sulfolane is utilized. Acetonitrile is particularly effective and desirable. These diluents are preferably employed in an amount of at least about 1 part by weight to 1 part of acid chloride. The foregoing diluents are further characterized by having a high dielectric constant, being inert to acid chlorides, and in the case of acetonitrile particularly, permitting the reaction to be carried out in a one-phase system.

The empiric nature of these diluents is illustrated by the fact that by employing the diluents covered herein, yields as high as 95% are obtained. Conversely, as demonstrated in the examples, other related diluents give much poorer yields. Co-diluents can be employed as well as mixtures of the specific diluents claimed.

The product can be recovered from the reaction system by simply stripping out the diluent.

This invention, product work-up and its advantages will be better understood by reference to the following example:

Example 1

43 gms. of the acid chloride, 40 gms. of urea and 240 ml. of acetonitrile were admixed and heated to reflux (83° C.) for 4 hours. The acetonitrile was then stripped off. After recrystallization from xylene, 41.8 gms. of product (melting point 172.5–174.5° C.) representing a yield of 88%, were recovered.

Similar results were obtained with nitromethane, nitroethane, nitropropanes and sulfolane.

By contrast, yields obtained in controlled experiments with other diluents are listed below.

| Diluent: | Yield, percent |
|---|---|
| Methyl isobutyl ketone | 54 |
| None | [1] 81 |
| Lutidine | 45 |
| Dimethyl formamide | 0 |
| $H_2SO_4$ | 0 |

[1] Solid system at end of reaction—difficult to handle.

The preparation of ureas as disclosed herein is applicable to the use of other acid chloride starting materials other than that of 2-ethyl-3-methyl pentanoic acid, such as 2-ethyl hexanoic acid.

The advantages of this invention will be apparent to the skilled in the art. Among these are high yields of pure products.

It is to be understood that this invention is not limited to the specific example which has been offered merely as an illustration, and that modifications can be made without departing from the spirit thereof.

What is claimed is:
1. A process for preparing 1-ethyl-2-methyl pentanoyl urea having the formula:

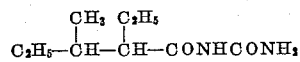

which comprises condensing the acid chloride of 2-ethyl-3-methyl pentanoic acid with urea in the presence of a diluent selected from the group consisting of nitromethane, nitroethane, nitropropanes, acetonitrile and sulfolane.

2. The process of claim 1 in which the diluent is used in an amount of at least 1 part by weight to 1 part of acid chloride.

3. The process of claim 2 in which a temperature of about 40–120° C. is employed.

4. The process of claim 3 in which the diluent is acetonitrile.

No references cited.

ALEX MAZEL, *Primary Examiner.*

HENRY R. JILES, *Assistant Examiner.*